(12) United States Patent
Xiong et al.

(10) Patent No.: US 12,439,143 B1
(45) Date of Patent: Oct. 7, 2025

(54) CAMERA MODULE AND ELECTRONIC DEVICE

(71) Applicant: NINGBO SUNNY OPOTECH CO., LTD, Yuyao (CN)

(72) Inventors: Shi Xiong, Yuyao (CN); Peng Lu, Yuyao (CN); Kai Chen, Yuyao (CN); Jie Yu, Yuyao (CN); Qianjin Cao, Yuyao (CN); Yuxiang Wang, Yuyao (CN); Cong Chen, Yuyao (CN)

(73) Assignee: NINGBO SUNNY OPOTECH CO., LTD, Yuyao (CN)

( * ) Notice: Subject to any disclaimer, the term of this patent is extended or adjusted under 35 U.S.C. 154(b) by 0 days.

(21) Appl. No.: 19/203,197

(22) Filed: May 9, 2025

(30) Foreign Application Priority Data

Oct. 16, 2024 (CN) .......................... 202411441911.8

(51) Int. Cl.
*H04N 23/55* (2023.01)
*H04N 23/51* (2023.01)
*H04N 23/54* (2023.01)

(52) U.S. Cl.
CPC ............ *H04N 23/55* (2023.01); *H04N 23/51* (2023.01); *H04N 23/54* (2023.01)

(58) Field of Classification Search
CPC ......... H04N 23/55; H04N 23/51; H04N 23/54

USPC .......................................................... 348/374
See application file for complete search history.

(56) References Cited

FOREIGN PATENT DOCUMENTS

| CN | 208572210 | | 3/2019 |
|---|---|---|---|
| CN | 110839124 | * | 2/2020 |

* cited by examiner

*Primary Examiner* — Joel W Fosselman
(74) *Attorney, Agent, or Firm* — Ying-Ting Chen (57) ABSTRACT

A camera module, which can effectively reduce a shoulder height to meet the miniaturization requirements, includes a photosensitive assembly including a support substrate, a photosensitive chip, and a molded part injection-molded on the support substrate; and a lens assembly including an insert base and an optical lens disposed on the insert base and located in the photosensitive path of the photosensitive chip, the insert base comprises a base body and an insert body embedded in the base body, the base body is fixed to the support substrate and defines a cavity together with the support substrate; wherein the molded part includes a molded base located in the cavity and a first protrusion extended outward from the molded base to outside the cavity, and the insert body and the first protrusion are staggered with each other in a circumferential direction of the base body.

18 Claims, 11 Drawing Sheets

CAMERA MODULE AND ELECTRONIC DEVICE

CROSS REFERENCE OF RELATED APPLICATION

This application is a non-provisional application that claims priority under 35U.S.C. § 119 to China application number CN 202411441911.8, filing date Oct. 16, 2024, wherein the entire content of which is expressly incorporated herein by reference.

BACKGROUND OF THE PRESENT INVENTION

Field of Invention

The present invention relates to the field of imaging technology, and more particular to a camera module and electronic device.

Description of Related Arts

As technology continues to advance, electronic devices equipped with camera functions are increasingly trending toward high performance and slim form factors. As one of the core components of electronic products, the camera module must adapt accordingly in terms of both performance and size. In other words, during this wave of technological innovation, every component within the camera module must undergo corresponding changes in performance and dimensions.

The motor, as an indispensable part of a high-pixel camera module, is responsible for driving the lens to move in multiple directions during operation. This enables optical autofocus (A F) and optical image stabilization (OIS) functions. With rising demands for imaging quality in electronic devices such as smartphones, lens assemblies are becoming larger and heavier, which in turn requires motors with greater driving force. This increase not only enlarges the volume occupied by the motor but also necessitates the use of a larger base to support it, making it difficult to meet the miniaturization requirements of modern camera modules.

To reduce the overall size of the camera module, current designs often embed components such as steel sheets or conductive pieces within the base. These inserts serve to ensure that the base, although thinner, still possesses sufficient strength to support the motor when a steel sheet is used, or to provide electrical connectivity between the photosensitive assembly and the motor when a conductive piece is embedded, thereby enabling compact motor wiring. However, in conventional camera modules, the base is typically fixed on top of the photosensitive assembly package, which results in a relatively high shoulder height of the module, hindering the pursuit of further miniaturization.

SUMMARY OF THE PRESENT INVENTION

The invention is advantageous in that it provides a camera module and electronic device which can effectively reduce a shoulder height of the camera module and meet the miniaturization requirements of the camera module.

Another advantage of the present invention is to provide a camera module and electronic device, wherein in order to achieve the above mentioned purpose, no expensive materials or complex structures are required in the present invention. Therefore, the present invention successfully and effectively provides a solution, not only providing a simple camera module and electronic device, but also increasing the practicality and reliability of the camera module and electronic device.

In order to achieve at least one of the above advantages or other advantages and purposes of the present invention, the present invention provides a camera module comprising:

a photosensitive assembly comprising a support substrate, a photosensitive chip, and a molded part injection-molded on the support substrate; and a lens assembly comprising an insert base and an optical lens disposed on the insert base and located in a photosensitive path of the photosensitive chip; the insert base comprises a base body and an insert body embedded in the base body, the base body is fixed to the support substrate and defines a cavity together with the support substrate;

wherein the molded part comprises a molded base located in the cavity and a first protrusion extended outward from the molded base to outside the cavity, and the insert body and the first protrusion are staggered with each other in a circumferential direction of the base body.

According to an embodiment of the present application, the support substrate comprises a photosensitive circuit board electrically connected to the photosensitive chip, the lens assembly further comprises a lens circuit board arranged on a side wall of the base body, wherein the lens circuit board is provided with pins electrically connected to the photosensitive circuit board, and the pins and the first protrusion are located on different sides of the base body.

According to an embodiment of the present application, the first protrusion and the pins are respectively located at front and rear sides of the base body.

According to an embodiment of the present application, the lens assembly comprises a magnetic member connected to the optical lens and a coil disposed on the lens circuit board and arranged corresponding to the magnetic member, and the coil is located on a side wall of the base body that is different from the side where the first protrusion is located.

According to an embodiment of the present application, the lens circuit board is provided with the coils on left and right side walls of the base body respectively.

According to an embodiment of the present application, the lens circuit board is located on an inner surface and/or outer surface of the base body, the insert base has an accommodating notch opened on a side wall of the base body for accommodating each corresponding coil, and the insert body is partially embedded in an interior of the base body and is located below the accommodating notch.

According to an embodiment of the present application, an upper surface of the first protrusion is lower than an upper surface of the molded base.

According to an embodiment of the present application, a step portion is provided on an outer side wall of the base body, and a step surface of the step portion is higher than the insert body; wherein the lens assembly further comprises a shell covering the base body, and a lower edge of the shell is located above the step surface of the step portion.

According to an embodiment of the present application, the molded part further comprises a second protrusion extended from the molded base to outside the cavity.

According to an embodiment of the present application, the first protrusion and the second protrusion are respectively arranged adjacent to diagonals of the insert base.

According to an embodiment of the present application, the second protrusion and the pins are staggered with each other in the circumferential direction of the base body.

According to an embodiment of the present application, the molded part further comprises a second protrusion extended from the molded base to outside the cavity.

According to an embodiment of the present application, the support substrate is provided with a groove matching the second protrusion, and the second protrusion is filled in the groove.

According to an embodiment of the present application, a cross-sectional area of the first protrusion is greater than a cross-sectional area of the second protrusion.

According to an embodiment of the present application, the insert base further comprises a third protrusion protruded inward from an inner surface of a rear side wall of the base body.

According to an embodiment of the present application, an inner side wall of the lens assembly is provided with an inwardly protruding protrusion assembly at at least one corner, and the molded part is provided with an avoidance notch group at at least one corner corresponding to the protrusion assembly on the molded base.

According to an embodiment of the present application, the protrusion assembly comprises a fourth protrusion protruded inward from a front corner of the lens assembly and a fifth protrusion protruded inward from a rear corner of the lens assembly, the avoidance notch group comprises a first avoidance notch located at a front corner of the molded base avoiding the fourth protrusion and a second avoidance notch located at a rear corner of the molded base avoiding the fifth protrusion, wherein the second avoidance notch is larger than the first avoidance notch.

According to an embodiment of the present application, the insert base has an accommodating area recessed inward from an outer surface of a rear side wall of the base body, wherein the lens assembly further comprises a lens circuit board arranged on a side wall of the base body and provided with pins, and the pins on the lens circuit board are located within the accommodating area.

According to an embodiment of the present application, the lens assembly further comprises a buffer member installed on the insert body, wherein the buffer member is at least partially located within the cavity and below a movable part of the lens assembly, and the buffer member is located on the outside of the molded base.

According to another aspect of the present application, the present application further provides an electronic device comprises a device body and any one of the camera modules described above, wherein the camera module is assembled on the device body.

Reference numerals in the drawings: 1, camera module; 10, photosensitive assembly; 11, support substrate; 110, groove; 111, photosensitive circuit board; 112, reinforcing plate; 1121, first support portion; 1122, second support portion; 12, photosensitive chip; 13, molded part; 130, avoidance notch group; 1301, first avoidance notch; 1302, second avoidance notch; 131, molded base; 132, first protrusion; 133, second protrusion; 14, optical filter; 20, insert base; 201, accommodating notch; 202, step portion; 21, base body; 210, first half groove; 22, insert body; 221, rear insert arm; 222, left insert arm; 223, right insert arm; 224, support arm; 225, partial insert arm; 23, third protrusion; 24, accommodating area; 25, buffer member; 26, cavity; 30, optical lens; 40, motor assembly; 41, lens circuit board; 42, pins; 43, magnetic member; 44, coil; 45, focus bracket; 450, second half groove; 46 anti-shake bracket; 47, ball bearing; 50, shell; 60, protrusion assembly; 61, fourth protrusion; 62, fifth protrusion.

The above description of the main component symbols is combined with the accompanying drawings and specific implementation methods to further illustrate the present invention in detail.

DETAILED DESCRIPTION OF THE PREFERRED EMBODIMENT

The following will be combined with the drawings in the embodiments of the present invention to clearly and completely describe the technical solutions in the embodiments of the present invention. Obviously, the described embodiments are only part of the embodiments of the present invention, not all of the embodiments. Based on the embodiments of the present invention, all other embodiments obtained by ordinary technicians in this field without creative work are within the scope of protection of the present invention.

It should be noted that when a component is referred to as being "mounted on" another component, it may be directly on the other component or there may be a central component. When a component is considered to be "set on" another component, it may be directly set on the other component or there may be a central component at the same time. When a component is considered to be "fixed to" another component, it may be directly fixed on the other component or there may be a central component at the same time.

Unless otherwise defined, all technical and scientific terms used herein have the same meaning as those commonly understood by those skilled in the art to which the present invention belongs. The terms used herein in the specification of the present invention are only for the purpose of describing specific embodiments and are not intended to limit the present invention. The term "or/and" used herein comprises any and all combinations of one or more of the related listed items.

Considering that the existing camera module fixes the base above the molded part of the photosensitive assembly, a shoulder height of the camera module is still relatively large, which makes it difficult to meet the miniaturization requirements of the camera module. Therefore, the present application proposes a camera module and an electronic device, which can effectively reduce the module shoulder height to meet the miniaturization requirements of the camera module.

Figure 1:
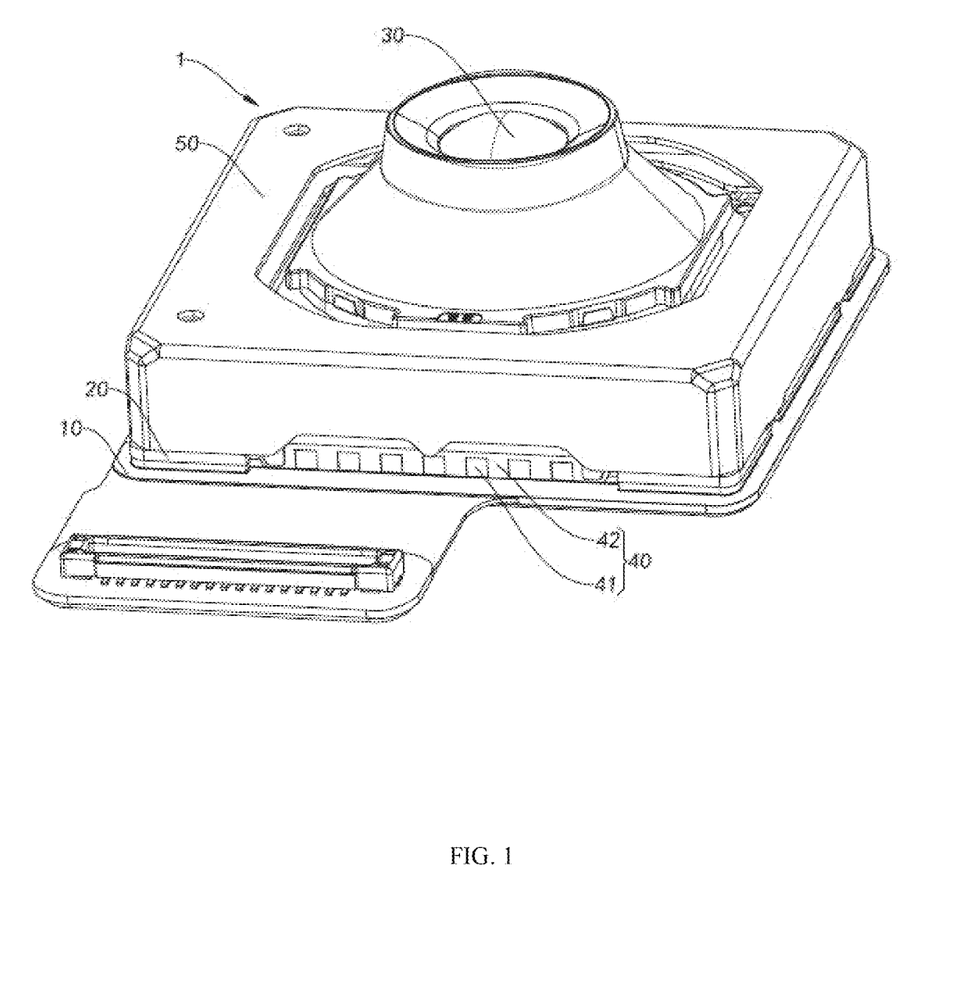
FIG. 1 is a perspective view of a camera module according to an embodiment of the present invention.
Figure 2:
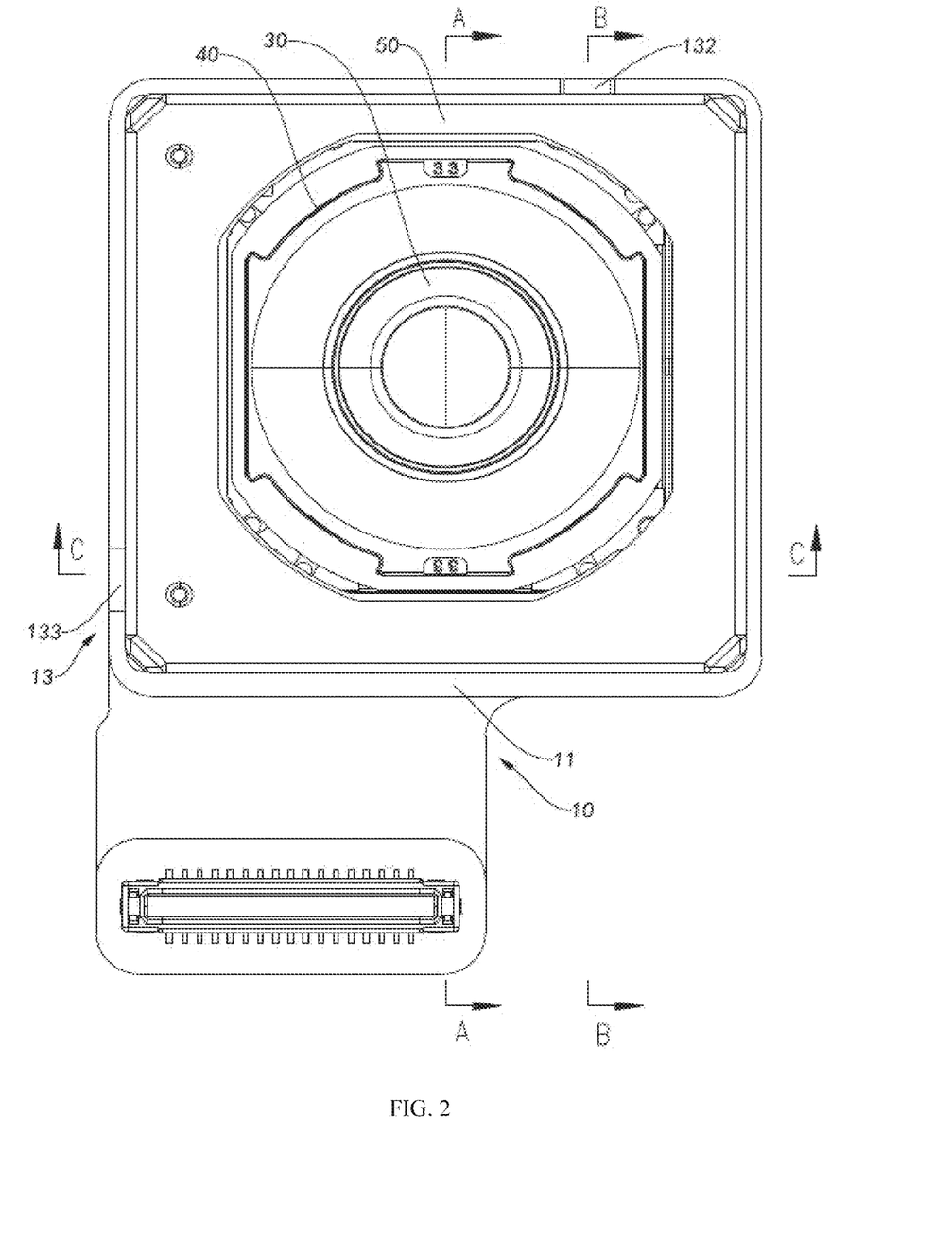
FIG. 2 is a schematic top view of the camera module according to the above embodiment of the present invention.

Specifically, referring to FIG. 1, an electronic device according an embodiment of the present application is illustrated, the electronic device comprises a device body and a camera module 1 mounted on the device body, so as to collect image information for the device body through the camera module 1. It is understood that the electronic device mentioned in the present application may be implemented as, but not limited to, a smart phone, a smart watch, a tablet or a notebook, etc.

More specifically, as shown in FIGS. 1 to 12, the camera module 1 comprises a photosensitive assembly 10 and a lens assembly. The photosensitive assembly 10 comprises a support substrate 11, a photosensitive chip 12, and a molded part 13 injection-molded on the support substrate 11. The lens assembly comprises an insert base 20 and an optical lens 30 disposed on the insert base 20 and located in a photosensitive path of the photosensitive chip 12. The insert base 20 comprises a base body 21 and an insert body 22 embedded in the base body 21, the base body 21 is fixed to the support substrate 11 and defines a cavity 26 together with the support substrate 11. In particular, the molded part 13 comprises a molded base 131 located within the cavity 26 and a first protrusion 132 extending outward from the molded base 131 to outside the cavity 26, and the insert body 22 and the first protrusion 132 are staggered with each other in a circumferential direction of the base body 21.

Figure 3:
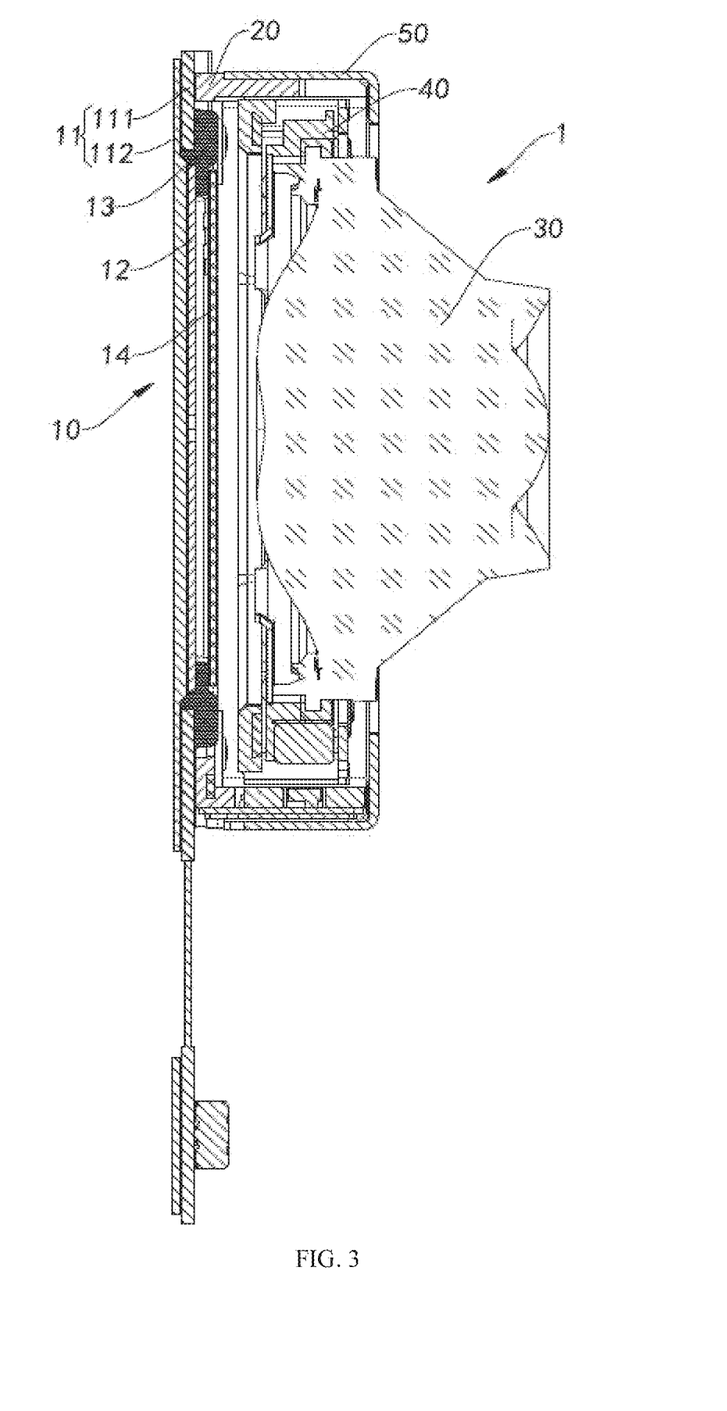
FIG. 3 shows an A-A cross-sectional view of the camera module shown in FIG. 2.
Figure 8:
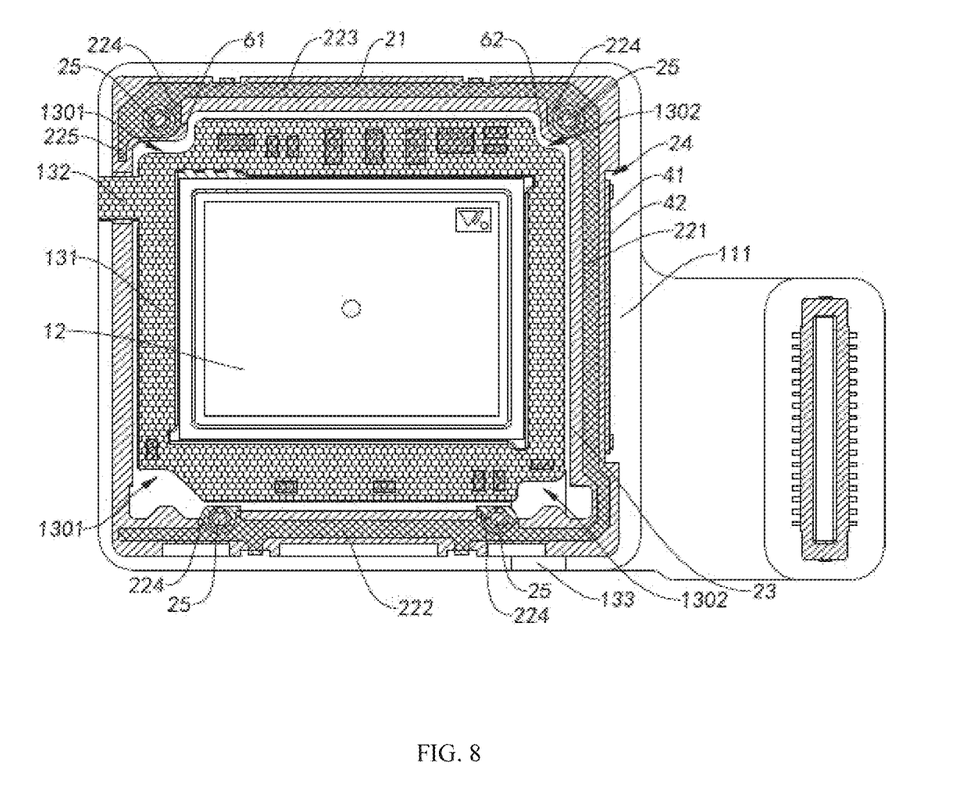
FIG. 8 shows a E-E cross-sectional view of the camera module shown in FIG. 6.

It is worth mentioning that in actual production, a plurality of the molded parts 13 are usually first batch-formed into an integral panel and then cut into single parts; at the same time, since the molded base 131 of the molded part 13 is usually located on an inner side of a periphery of the support substrate 11, and the cutting must be done along the periphery of the support substrate 11, the molded part 13 must have an extended first protrusion 132, so that cutting can be performed at the edge of the first protrusion 132. However, on the one hand, as shown in FIGS. 3 to 5, the base body 21 of the insert base 20 in the camera module 1 of the present application is located on the periphery of the molded base 131 of the molded part 13 and is directly fixed to the support substrate 11, that is, the lens assembly is installed on the support substrate 11 which is lower than the molded part 13, so that the shoulder height of the camera module 1 of the present application is reduced; on the other hand, as shown in FIGS. 4 and 8, the first protrusion 132 of the molded part 13 and the insert body 22 of the insert base 20 are staggered with each other in the circumferential direction, which can avoid the first protrusion 132 from interfering with the insert body 22 while reducing the restriction on the height of the first protrusion 132 caused by the embedding of the insert body 22, allowing the insert body 22 and the first protrusion 132 to overlap with each other in the height direction of the camera module 1 so as to further reduce the shoulder height of the camera module 1.

Figure 4:
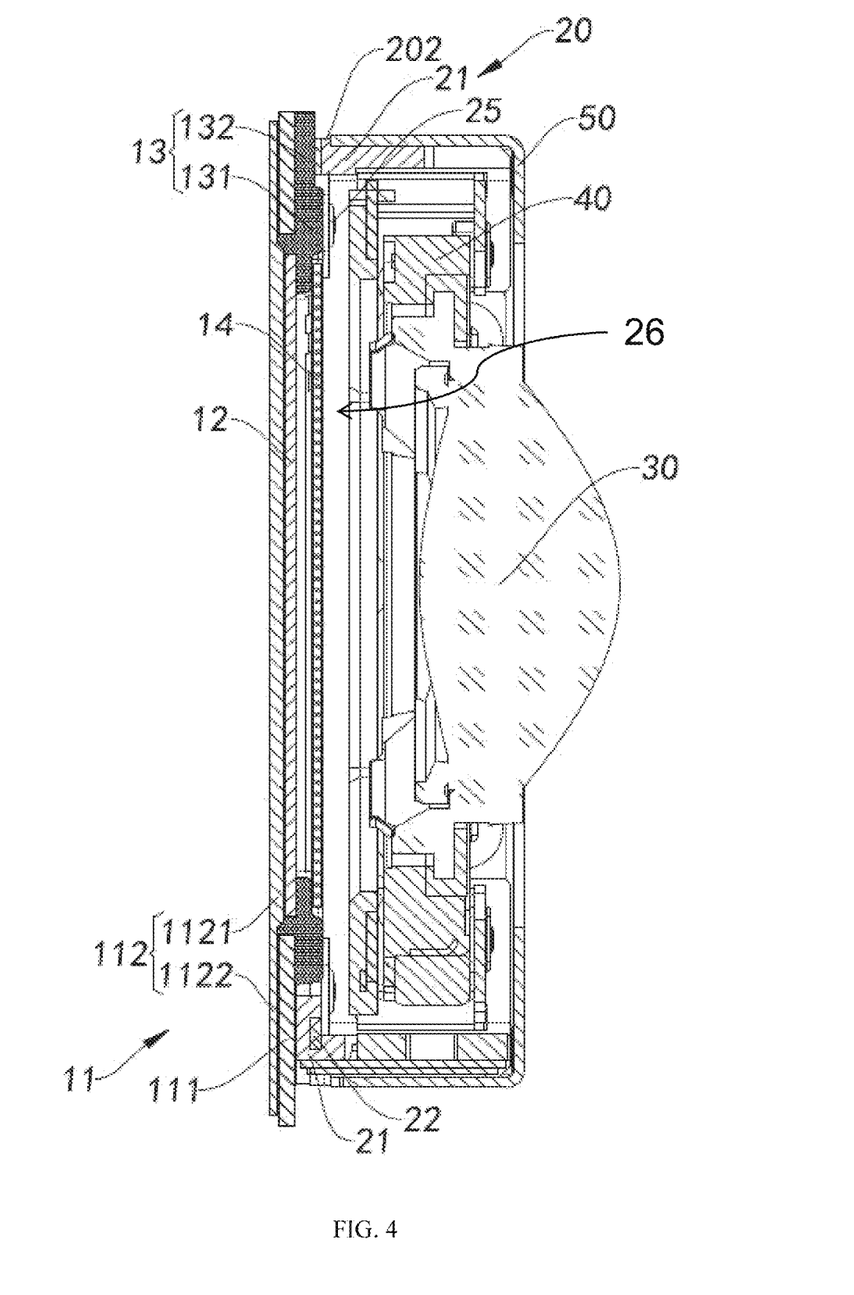
FIG. 4 shows a B-B cross-sectional view of the camera module shown in FIG. 2.
Figure 5:
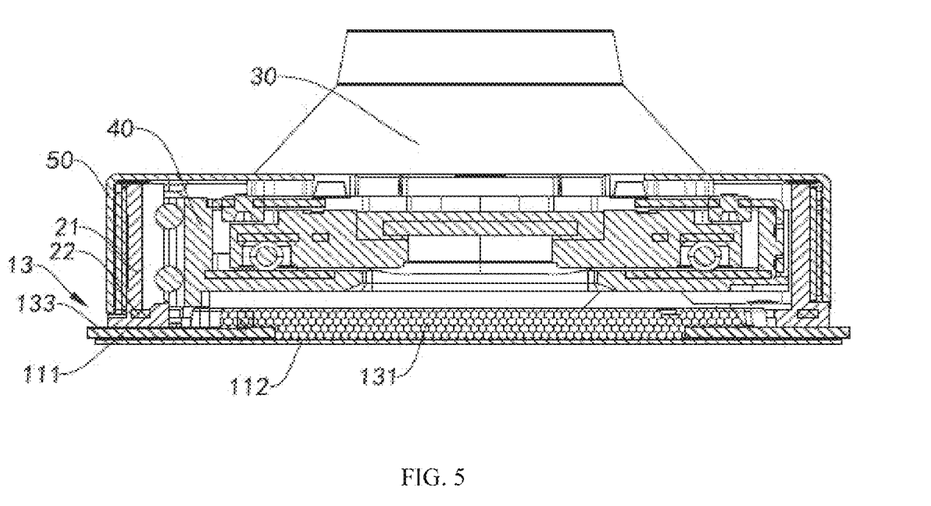
FIG. 5 shows a C-C cross-sectional view of the camera module shown in FIG. 2.

In addition, in some embodiments of the present application, as shown in FIGS. 1 to 12, the support substrate 11 may comprise a photosensitive circuit board 111 electrically connected to the photosensitive chip 12. Specifically, a front surface of the photosensitive chip 12 has a photosensitive area and a non-photosensitive area located outside the photosensitive area, and the non-photosensitive area of the photosensitive chip 12 is electrically connected to the photosensitive circuit board 111. The manner of electrically connecting the non-photosensitive area of the photosensitive chip 12 to the photosensitive circuit board 111 can be any one of the following: the photosensitive chip 12 is located above the photosensitive circuit board 111, and the non-photosensitive area of the photosensitive chip 12 is electrically connected to the front side of the photosensitive circuit board 111 (such as by gold wires), which is similar to a traditional COB packaging structure; or, as shown in FIG. 4, the photosensitive circuit board 111 is provided with a through hole, the photosensitive chip 12 is accommodated in the through hole of the photosensitive circuit board 111, and the non-photosensitive area of the photosensitive chip 12 is electrically connected to the front side of the photosensitive circuit board 111 (such as by gold wires), which is similar to a chip sinking packaging structure; the photosensitive chip 12 is located below the photosensitive circuit board 111, and the non-photosensitive area of the photosensitive chip 12 is electrically connected to a back side of the photosensitive circuit board 111 (such as by welding or conductive adhesive bonding), which is similar to a chip flip-chip structure.

In one embodiment, the installation base of the photosensitive chip 12 is the photosensitive circuit board 111, the photosensitive chip 12 is mounted on the front side of the photosensitive circuit board 111, or the photosensitive chip 12 is flipped on the back side of the photosensitive circuit board 111; in another embodiment, the installation base of the photosensitive chip 12 is the molded part 13, the molded part 13 is arranged on the front side of the photosensitive circuit board 111, the photosensitive chip 12 is mounted on the front side of the molded part 13, or the molded part 13 is arranged in the through hole of the photosensitive circuit board 111, the photosensitive chip 12 is mounted on the front side of the molded part 13, or the photosensitive chip 12 is accommodated in the through hole of the photosensitive circuit board 111, the molded part 13 is arranged on the back side of the photosensitive circuit board 111, and the photosensitive chip 12 is mounted on the front side of the molded part 13. In other embodiments, the support substrate 11 may comprise a reinforcing plate 112 which may be disposed on the front or back side of the photosensitive circuit board 111, and the photosensitive chip 12 is mounted on the reinforcing plate 112; alternatively, the reinforcing plate 112 may also be disposed on the surface of the molded part 13 (such as assembled by mounting or embedding), and the photosensitive chip 12 is mounted on the reinforcing plate 112.

Exemplarily, the molded base 131 of the molded part 13 may be frame-shaped and encapsulated at an electrical connection between the photosensitive circuit board 111 and the photosensitive chip 12, so as to protect the electrical connection between the photosensitive circuit board 111 and the photosensitive chip 12. Generally, in order to reduce the circumferential size of the photosensitive chip 12, the electrical connection structure electrically connected to the photosensitive circuit board 111 in the non-photosensitive area of the photosensitive chip 12 is distributed on part of the side of the photosensitive chip 12, such as one side or both sides in the length direction of the photosensitive area, so that the geometric center of the non-photosensitive area of the photosensitive chip 12 deviates from the geometric center of the photosensitive chip 12, and the first protrusion 132 of the molded part 13 can adjust the geometric center of the molded part 13, so as to improve the stress distribution of the molded part 13 on the photosensitive chip 12 during solidification and shrinkage, so as to reduce the warping of the photosensitive chip 12. It can be understood that the molded base 131 of the molded part 13 mentioned in the present application can be but not limited to a frame-like structure surrounding the photosensitive chip 12, and can also be a strip-like structure, such as there are two groups of molded bases 131 which are arranged at intervals along the length direction or width direction of the photosensitive chip 12.

In order to further reduce the overall height of the camera module 1, the photosensitive chip 12 is arranged to be sunken with respect to the support substrate 11, so that the back surface of the photosensitive chip 12 is lower than the top surface of the support substrate 11, so as to utilize the overlap of the support substrate 11 and the photosensitive chip 12 in the optical axis direction to thin the photosensitive assembly 10. It can be understood that the front of the photosensitive chip 12 has the photosensitive area and the non-photosensitive area located outside the photosensitive area; the molded base 131 of the molded part 13 covers the non-photosensitive area of the photosensitive chip 12 and a part of the support substrate 11, and fills a gap between the support substrate 11 and the photosensitive chip 12, thereby encapsulating the electrical connection structure between the photosensitive chip 12 and the support substrate 11.

Further, as shown in FIG. 3, FIG. 4, FIG. 11 and FIG. 12, the reinforcing plate 112 comprises a first support portion 1121 for mounting the photosensitive chip 12 and a second support portion 1122 located around the first support portion 1121 for mounting the photosensitive circuit board 111, so as to strengthen the overall structural strength of the photosensitive assembly 10 through the reinforcing plate 112, so that the photosensitive circuit board 111 is not easy to warp, and the photosensitive chip 12 is prevented from breaking. It is understandable that the reinforcing plate 112 mentioned in the present application can be implemented as a steel plate but is not limited to it.

Figure 12:
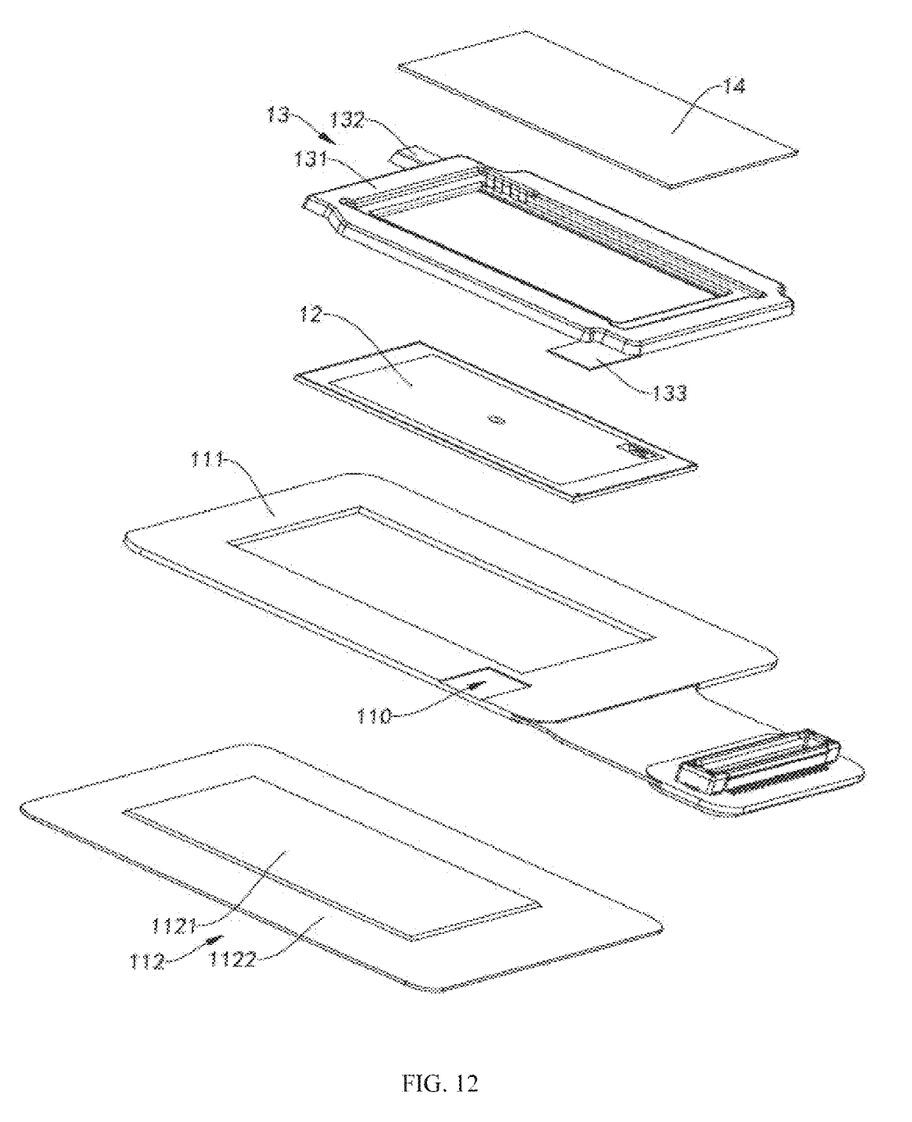
FIG. 12 is an exploded view of the photosensitive assembly according to the above embodiment of the present application.

Furthermore, as shown in FIGS. 4 and 12, the first support portion 1121 is protruded upward from the second support portion 1122, that is, an upper surface of the second support portion 1122 is lower than an upper surface of the first support portion 1121, so as to ensure that the camera module 1 has the characteristics of low shoulder height while supporting the photosensitive chip 12 to partially protrude from the top surface of the photosensitive circuit board 111 to avoid blocking the photosensitive field of view of the photosensitive chip 12.

Furthermore, as shown in FIGS. 3, 4, 11 and 12, the photosensitive assembly 10 may further comprise an optical filter 14 which is adhered and fixed to the molded base 131 of the molded part 13 to form a sealed space for accommodating the photosensitive chip 12, which is beneficial to protecting the photosensitive area of the photosensitive chip 12 and avoiding contamination.

In addition, in other examples of the present application, the support substrate 11 may not comprise a circuit board electrically connected to the photosensitive chip 12, but only comprise a steel plate for support. In this case, the photosensitive chip 12 can be designed with a BGA (Ball Grid Array) to connect to an external power supply board.

Optionally, as shown in FIG. 1 and FIG. 8, the lens assembly further comprises a lens circuit board 41 disposed on a side wall of the base body 21 and provided with pins 42, and the pins 42 and the first protrusion 132 are located on different sides of the base body 21. In this way, the first protrusion 132 in the camera module 1 of the present application can avoid the side where the pins 42 are located, thereby reserving more space to install a larger lens circuit board 41 without increasing the external dimensions of the base body 21, so as to adapt to the requirements of the lens assembly for complex circuits. It is understandable that the pins 42 mentioned in the present application can be used to electrically connect the lens circuit board 41 to the photosensitive circuit board 111. The lens circuit board 41 is a power supply circuit board of the lens assembly. When the lens assembly comprises an actuator, the actuator is electrically connected to the lens circuit board 41. The actuator can be arranged for moving and/or rotating the optical lens 30, or can be arranged for driving movement a variable aperture or an adjustable lens.

Preferably, as shown in FIG. 1 and FIG. 8, the first protrusion 132 and the pin 42 are respectively located on the front and rear sides of the photosensitive chip 12 so as to reserve a larger space for installing the lens circuit board 41 with a complex circuit. It is understandable that the photosensitive circuit board 111 may comprise a rigid board electrically connected to the photosensitive chip 12 and bonded and fixed to the insert base 20, a soft board electrically connected to the rigid board, and a connector fixed to the soft board and used to be electrically connected to the power supply structure. In this way, the first protrusion 132 can be integrally extend from a front side surface of the molded base 131 to a front side edge of the rigid board; the soft board is extended backward from a rear side edge of the rigid board, and the pins 42 are located on the rear side of the lens circuit board 41.

Figure 9:
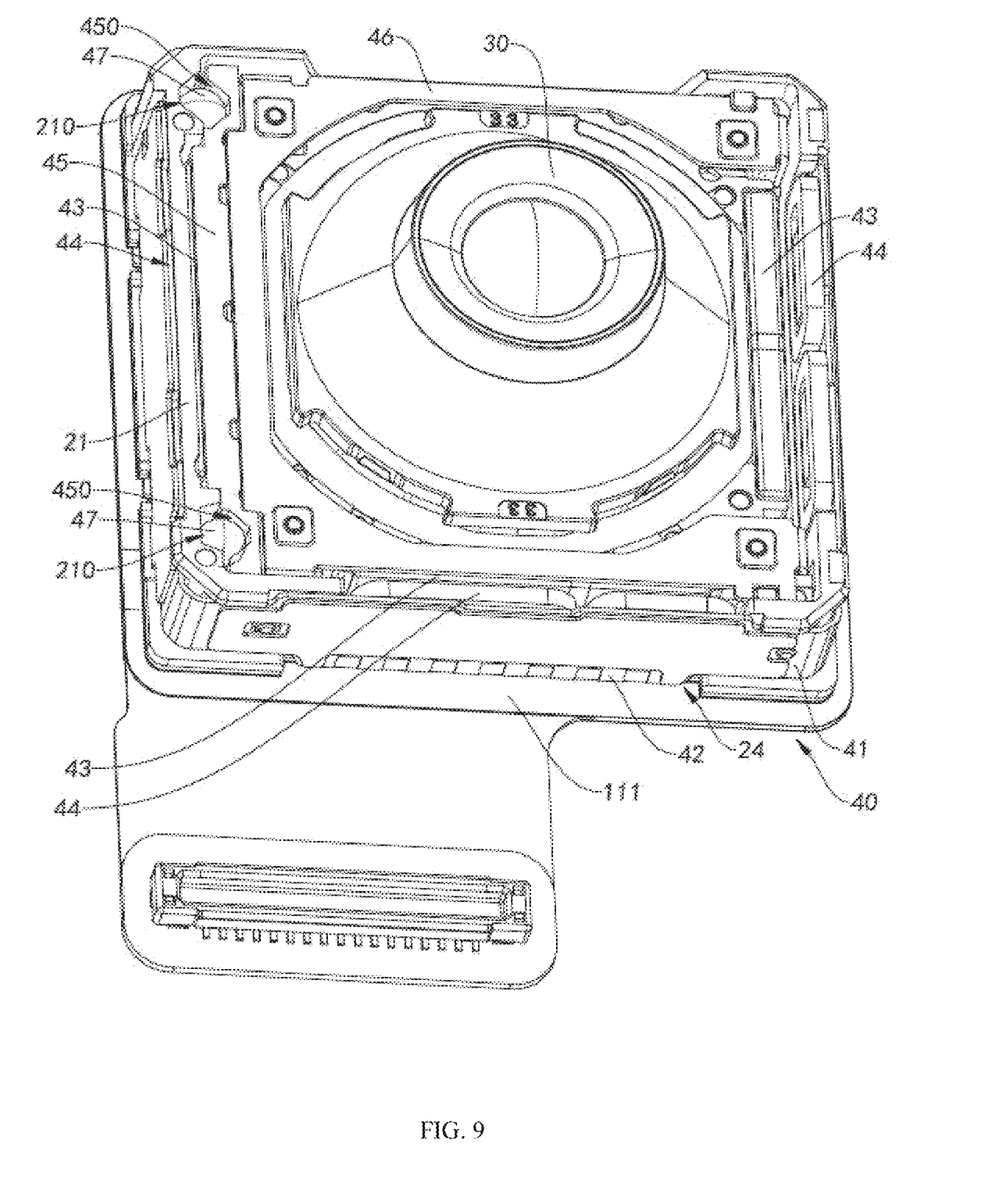
FIG. 9 is a schematic view of a camera module according to the above embodiment of the present invention, wherein the yoke is removed.

Optionally, as shown in FIG. 9, the lens assembly further comprises a magnetic member 43 connected to the optical lens 30 and a coil 44 disposed on the lens circuit board 41 and arranged corresponding to the magnetic member 43, and the coil 44 is located on a side wall of the base body 21 that is different from the side where the first protrusion 132 is located. Preferably, the lens circuit board 41 is provided with coils 44 on both of the left and right side walls of the base body 21, so as to better drive the optical lens 30 to move with respect to the photosensitive chip 12.

It is worth noting that, as shown in FIG. 1 and FIG. 9, the lens circuit board 41, pins 42, magnetic members 43 and coils 44 mentioned in the present application together constitute a motor assembly 40 to drive the optical lens 30 to move with respect to the photosensitive chip 12 to achieve the autofocus function and/or optical image stabilization function of the camera module 1. It is understandable that in other examples of the present application, the lens assembly may not comprise the motor assembly 40, and the optical lens 30 may be directly fixed to the insert base 20, so that the camera module 1 is implemented as a fixed focus module.

In addition, in order to simultaneously realize the autofocus function and optical image stabilization function of the camera module 1, as shown in FIG. 9, the motor assembly 40 of the lens assembly of the present application can also comprise a focus bracket 45 movably arranged in the base body 21 and an anti-shake bracket 46 movably arranged in the focus bracket 45 and fixedly connected to the optical lens 30; at the same time, a coil 44 located on the left side wall of the base body 21 and electrically connected to the lens circuit board 41 is used as a focus coil; a magnetic part 43 fixedly arranged on the focus bracket 45 and corresponding to the focus coil is used as a focus magnetic part; a pair of coils 44 respectively located on the rear side wall and the right side wall of the base body 21 and electrically connected to the lens circuit board 41 are used as anti-shake coils; a pair of magnetic members 43 fixedly arranged on the anti-shake bracket 46 and respectively corresponding to the two anti-shake coils are used as anti-shake magnetic members. In this way, when the focus coil is energized, a Lorentz force is generated between the focus coil and the focus magnetic member to drive the focus bracket 45 to move along the optical axis, and drive the anti-shake bracket 46 together with the optical lens 30 to move along the optical axis (i.e., the Z-axis direction), thereby realizing the automatic focusing function of the camera module 1; when the anti-shake coil located on the right side wall is energized, the anti-shake coil located on the right side wall will generate a Lorentz force with the corresponding anti-shake magnetic part to drive the anti-shake bracket 46 to move in the left and right direction, and drive the optical lens 30 to move in the left and right direction (i.e., the X-axis direction), thereby realizing the X-axis anti-shake function of the camera module 1; when the anti-shake coil located on the rear side wall is energized, the anti-shake coil located on the rear side wall will generate a Lorentz force with the corresponding anti-shake magnetic part to drive the anti-shake bracket 46 to move in the front-to-back direction, and drive the optical lens 30 to move in the front-to-back direction (i.e., the Y-axis direction), thereby realizing the Y-axis anti-shake function of the camera module 1.

It is understandable that the magnetic members mentioned in the present application can be implemented as magnets but are not limited to them. In addition, a ball bearing can be arranged between the focus bracket 45 and the anti-shake bracket 46 to movably support the anti-shake bracket 46 on the focus bracket 45, so as to meet the movable space required for optical image stabilization.

Figure 7:
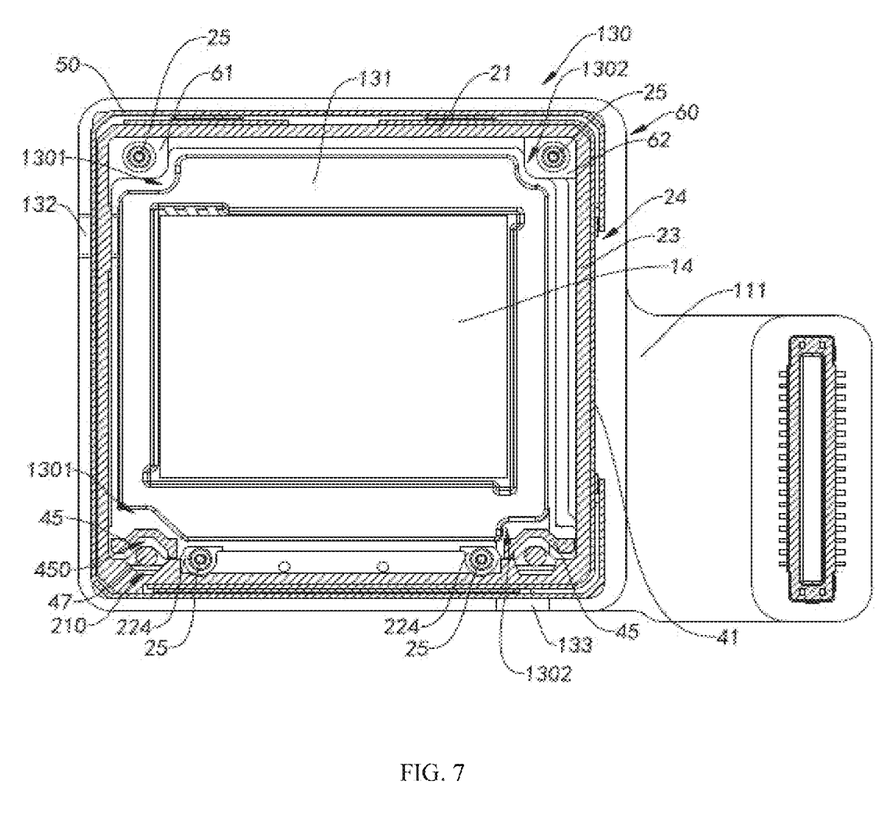
FIG. 7 shows a D-D cross-sectional view of the camera module shown in FIG. 6.

Optionally, as shown in FIGS. 7 to 9, the lens circuit board 41 is located on an outer surface of the base body 21, and the insert base 20 has one or more accommodating notches 201 opened on the side wall of the base body 21 for accommodating the coils 44, so as to make full use of the side wall space of the base body 21 to install the coils, which helps to further reduce the circumferential size of the camera module 1. It is understandable that in other examples of the present application, the lens circuit board 41 can also be located on an inner surface of the base body 21, and this application will not elaborate further on this.

For example, the accommodating notch 201 opened on the left side wall of the base body 21 can accommodate the focus coil; the accommodating notch 201 opened on the right side wall of the base body 21 can accommodate the anti-shake coil; at the same time, the first protrusion 132 located on the front side of the photosensitive chip 12 passes through the front side wall of the base body 21, which can avoid the focus coil and the anti-shake coil, so as to reserve more installation space for the coils on the left and right sides of the base body 21.

Optionally, as shown in FIGS. 7 and 9, the lens circuit board 41 is covered on the left side wall, rear side wall and right side wall of the base body 21, and the pins 42 are located on the rear side of the lens circuit board 41 so as to be electrically connected to the rigid board to realize power supply to the motor assembly 40.

Figure 6:
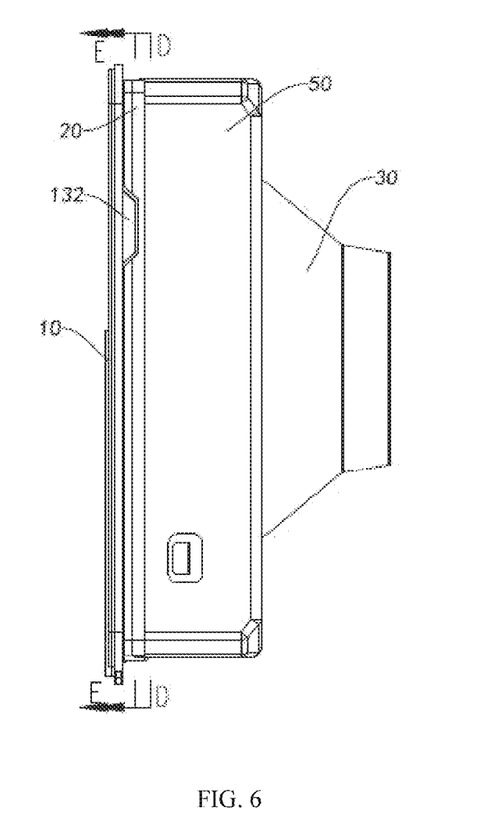
FIG. 6 is a side view of the camera module according to the above embodiment of the present invention.

It is worth mentioning that although the accommodating notches for accommodating the coils on the left and right walls of the base body 21 can realize the miniaturization of the motor, the structure of the left and right walls of the base body 21 will become relatively weak. Therefore, as shown in FIGS. 6 to 8, the insert body 22 of the insert base 20 is partially embedded in the interior of the base body 21 and is located below the accommodating notch 201, so that the insert body 22 is located below the coil 44, so as to enhance the structural strength of the left and right walls of the base body 21. It can be understood that since the insert body 22 needs to reserve as much installation space as possible for the coil, the embedded height of the insert body 22 on the base body 21 is designed to be relatively low. If the first protrusion 132 is set below the insert body 22, the shoulder height of the module will increase, making it difficult to achieve a low shoulder height module. Therefore, the camera module 1 of the present application sets the first protrusion 132 on the front side of the base body 21 to avoid the insert body 22 and the coils, which helps to reserve more installation space for the insert body 22 and the coils on the left and right walls of the base body 21.

In addition, the insert body 22 can be implemented as a conductive sheet such as, but not limited to, a copper sheet. It can be understood that in other embodiments of the present application, the insert body 22 can be used as a conductive member in addition to being a reinforcement member of the base body 21, such as a conductive member of a moving coil motor, that is, the positions of the coil and the magnetic member are interchanged, and a spring sheet is provided between the bracket and the base, so that the lens circuit board 41 and the coil are connected together through the spring sheet and the insert body 22 embedded in the base body 21.

It should be noted that in the above embodiment of the present application, as shown in FIG. 4, the upper surface of the first protrusion 132 is lower than the upper surface of the molded base 131, so that the base body 21 reserves more space above the first protrusion 132 to design other structures. For example, the outer wall of the base body 21 is usually provided with a step portion for the yoke to rest on or a buckle for the yoke to be snapped, and the spacing between structures such as the step portion or the buckle and the lower edge of the base body 21 needs to meet certain injection molding requirements; therefore, the lower the first protrusion 132 is designed, the larger the size of the base body 21 above the first protrusion 132, and the more space there is for designing other structures.

Optionally, as shown in FIG. 4, a step portion 202 is provided on the outer side wall of the base body 21, and a step surface of the step portion 202 is higher than the insert body 22; in this case, the lens assembly may further comprise a shell 50 that is covered on the base body 21, and a lower edge of the shell 50 is located above the step surface of the step portion 202. In this way, the design of the step portion 202 can not only form a recessed space for accommodating the shell 50 on the outer side wall of the base body 21 to maintain a good appearance of the module, but also if the lower edge of the shell 50 contacts the step surface of the step portion 202, the step surface can also play a role in limiting or supporting the shell 50. It can be understood that the shell 50 mentioned in the present application can be, but is not limited to, implemented as a yoke.

It is worth noting that in the camera module 1 of the above-mentioned embodiment of the present application, as shown in FIGS. 2, 5, 11 and 12, the molded part 13 of the photosensitive assembly 10 further comprises a second protrusion 133 extended from the molded base 131 to the outside of the cavity 26, it is because that an injection flow channel when processing the molded part 13 should be formed, so that it is convenient for exhaust during injection molding.

Figure 11:
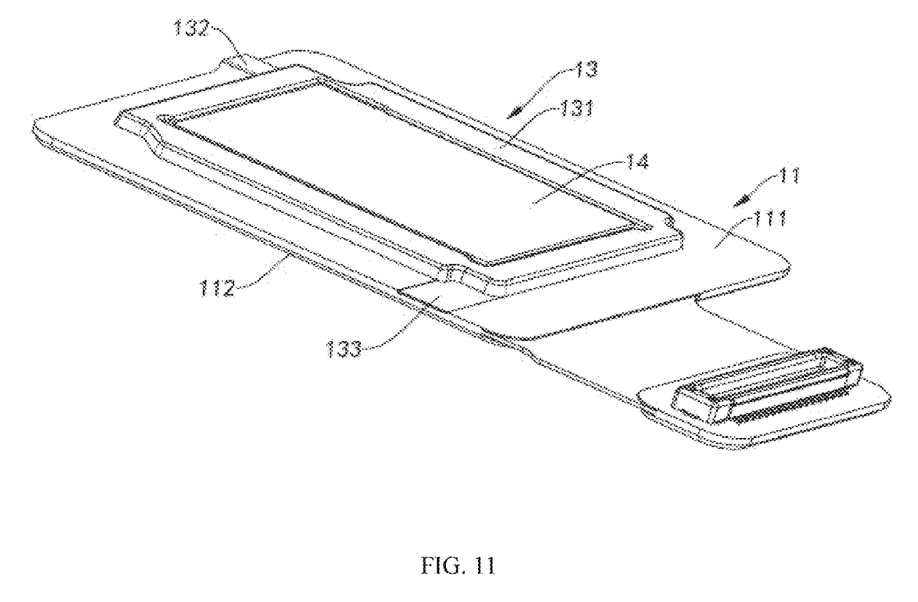
FIG. 11 is a perspective view of the photosensitive assembly in the camera module according to the above embodiment of the present invention.

Optionally, as shown in FIGS. 11 and 12, the support substrate 11 is provided with a groove 110 matching the second protrusion 133, and the second protrusion 133 is filled in the groove 110 so as to avoid the insert body 22 of the insert base 20, ensuring that the camera module 1 has a lower shoulder height.

Optionally, as shown in FIGS. 8 and 9, the second protrusion 133 and the pins 42 are staggered in the circumferential direction of the base body 21, that is, the second protrusion 133 can avoid the side where the pins 42 are located, thereby reserving more space for installing a larger lens circuit board 41 without increasing the external dimensions of the base body 21, so as to adapt to the lens assembly's requirements for complex circuits.

For example, as shown in FIGS. 11 and 12, the second protrusion 133 is extended leftward from a left side surface of the molded base 131 to a left edge of the rigid board, so that the first protrusion 132 and the second protrusion 133 are respectively located on different sides of the molded base 131, so as to exhaust gas through the groove 110 during injection molding, which is beneficial to the injection molding of the molded part 13. It can be understood that during the injection molding process of the molded part 13, the upper and lower molds will be pressed onto the upper and lower surfaces of the support substrate 11 when the molds are closed, so as to form a chamber, an inlet channel connected to the chamber and a channel outlet connected to the groove 110 and the chamber inside; in this way, during injection molding, the molding liquid enters the chamber from the inlet channel, and after filling the chamber, the excess molding liquid flows out from the channel outlet and fills the groove 110; and then after the molding liquid is solidified and formed, the part filled in the inlet channel forms the first protrusion 132, the part filled in the chamber forms the molded base 131, and the part filled in the groove 110 forms the second protrusion 133.

Optionally, a cross-sectional area of the first protrusion 132 is greater than a cross-sectional area of the second protrusion 133, so that a pressure difference is formed inside the molds from the inlet channel to the channel outlet, so as to accelerate the flow of the molding liquid inside the molds and ensure that the molding liquid can quickly fill the molds. It is understood that the cross-sectional area mentioned in this application refers to the cross-sectional area of the first protrusion 132 or the second protrusion 133 cut along a direction perpendicular to its extension direction.

Preferably, as shown in FIGS. 4 and 5, a thickness of the first protrusion 132 is greater than a thickness of the second protrusion 133, so as to ensure that the cross-sectional area of the first protrusion 132 is greater than the cross-sectional area of the second protrusion 133 while reducing the depth of the groove 110, which helps to select a thinner support substrate 11.

Optionally, as shown in FIG. 2, FIG. 7, FIG. 8 and FIG. 11, the first protrusion 132 and the second protrusion 133 are respectively arranged adjacent to the diagonal sides of the insert base 20. For example, the first protrusion 132 is arranged adjacent to the right side wall of the base body 21; the second protrusion 133 is arranged adjacent to the rear side wall of the base body 21, so that the first protrusion 132 is located at the right front corner of the insert base 20, and the second protrusion 133 is located at the left rear corner of the insert base 20. In this way, the second protrusion 133 is far away from the first protrusion 132, so that the injection passage can be extended, so that during injection molding, the molding liquid can more easily fill the chamber inside the molds.

It is worth noting that, considering that the left side wall of the insert body 22 on the base body 21 will limit the height of the second protrusion 133, the camera module 1 of the present application has the groove 110 on the rigid board of the photosensitive circuit board 111 to accommodate the second protrusion 133, so as to reduce the shoulder height of the module. It is understandable that in other examples of the present application, the left side wall of the base body 21 can also be provided with an upper groove corresponding to the second protrusion 133, so as to form an exhaust channel during the injection molding process together with the groove 110 on the rigid board, so that after the injection molding is completed, the second protrusion 133 will be partially higher than the rigid board, which is not conducive to the design of the low shoulder height of the module.

In addition, as shown in FIGS. 7 and 8, the inner wall of the lens assembly is provided with an inwardly protruding protrusion assembly 60 at at least one corner, and the molded part 13 is provided with an avoidance notch group 130 at at least one corner corresponding to the protrusion assembly 60 on the molded base 131 to avoid the protrusion assembly 60, which helps to further reduce the circumferential size of the camera module 1.

Optionally, as shown in FIG. 7 and FIG. 8, the protrusion assembly 60 comprises a fourth protrusion 61 protruded inward from a front corner of the lens assembly and a fifth protrusion 62 protruded inward from the rear corner of the lens assembly; the avoidance notch group 130 comprises a first avoidance notch 1301 located at a front corner of the molded base 131 and avoiding the fourth protrusion 61, and a second avoidance notch 1302 located at a rear corner of the molded base 131 and avoiding the fifth protrusion 62. For example, as shown in FIG. 8, the fourth protrusion 61 and the fifth protrusion 62 are respectively provided at the front and rear ends of the right side wall of the base body 21; accordingly, the first avoidance notch 1301 and the second avoidance notch 1302 for avoiding the fourth protrusion 61 and the fifth protrusion 62 are respectively provided at the right front corner and the right rear corner of the molded base 131, so as to reduce the circumferential size of the camera module 1. It can be understood that, in one embodiment, the fourth protrusion 61 and the fifth protrusion 62 can be formed by a protruding structure or a guiding structure on the insert base 20.

Figure 10:
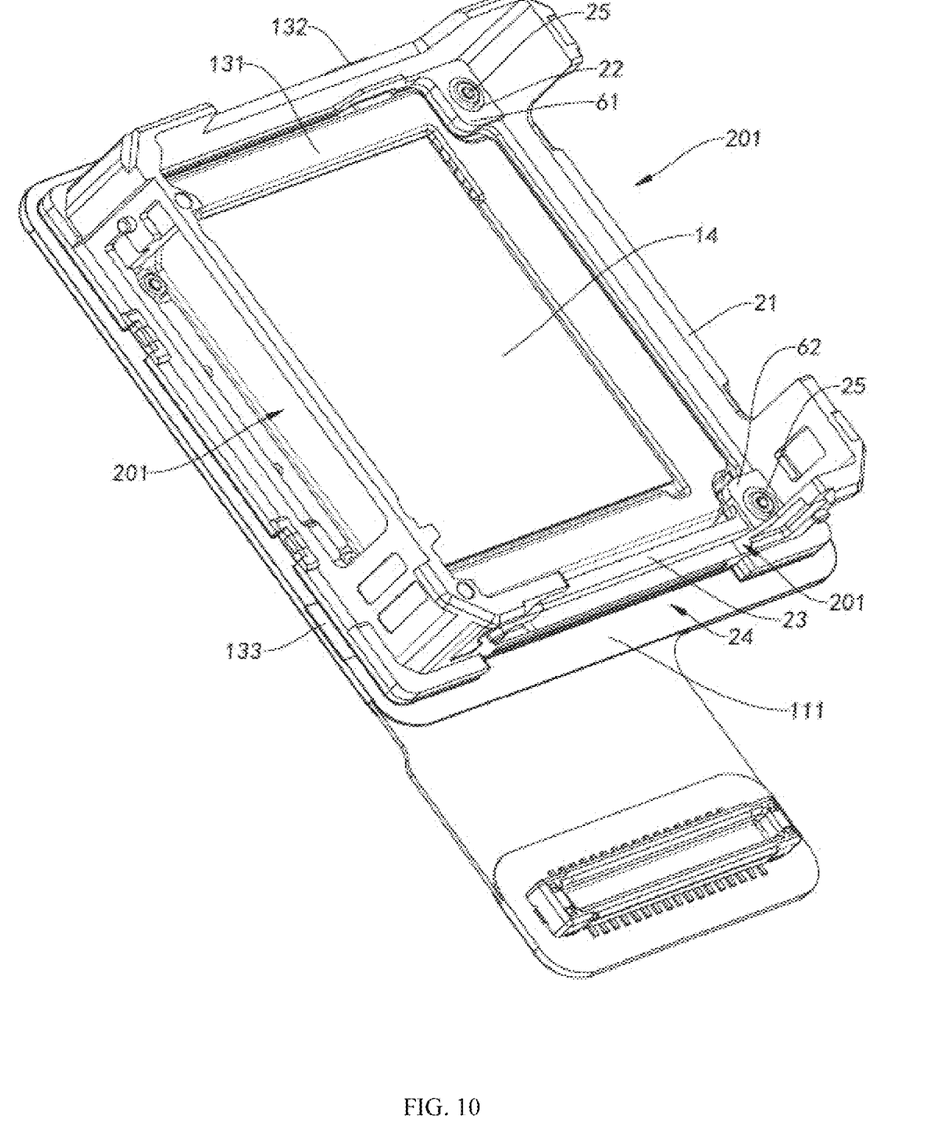
FIG. 10 is a schematic view showing the matching structure of a photosensitive assembly and an insert base in the camera module according to the above embodiment of the present invention.

Optionally, as shown in FIGS. 7, 8 and 10, the insert base 20 may further comprise a third protrusion 23 protruded inward from an inner surface of the rear side wall of the base body 21 to increase the thickness of the rear side wall of the base body 21, thereby providing more embedded space for the insert body 22, such as increasing the width of the insert body 22 in the front-to-back direction, which helps to enhance the structural strength of the insert base 20 at the rear side wall of the base body 21.

Optionally, as shown in FIG. 7, FIG. 8 and FIG. 9, the insert base 20 further has an accommodating area 24 that is recessed inward from the outer surface of the rear side wall of the base body 21, and the pins 42 on the lens circuit board 41 are located within the accommodating area 24 to protect the pins 42. It is understood that in other examples of the present application, the insert base 20 may not be provided with the accommodating area 24, so that the pins 42 are directly exposed outside the base body 21.

It is worth noting that, since the third protrusion 23 is protruded forward from the front surface of the rear side wall of the base body 21, the geometric center of the molded part 13 with respect to the insert base 20 is closer to the front side of the insert base 20, so the fourth protrusion 61 located at the front end of the right side wall of the base body 21 overlaps more with the molded base 131 of the molded part 13 in the front-to-back direction. In other words, the molded base 131 needs to reserve more avoidance space on the front side of the base body 21, that is, as shown in FIGS. 7 and 8, the second avoidance notch 1302 is larger than the first avoidance notch 1301.

In addition, according to the above mentioned embodiment of the present application, as shown in FIG. 4, FIG. 7 and FIG. 8, the lens assembly further comprises a buffer member 25 installed on the insert body 22; wherein the buffer member 25 is at least partially located within the cavity 26 and below the movable part of the lens assembly, and the buffer member 25 is located outside the mold base 131 to prevent the movable part of the lens assembly from colliding with the molded part 13 when moving downward. It can be understood that the movable part of the lens assembly mentioned in the present application may comprise the optical lens 30, the magnetic member 43, the focus bracket 45 and the anti-shake bracket 46, so as to limit the downward movement of the focus bracket 45 and prevent the focus bracket 45 from colliding with the molded part 13 when moving downward along the optical axis.

Optionally, as shown in FIG. 8, the insert body 22 partially extends to the outside of the base body 21, and the buffer member 25 is fixed to the portion of the insert body 22 located outside the base body 21, so as to stably support the buffer member 25 and improve the buffering performance of the buffer member 25.

Exemplarily, as shown in FIG. 8, the insert body 22 may comprise a rear insert arm 221 extending left and right along the rear side wall of the base body 21, a left insert arm 222 extending forward from the left end of the rear insert arm 221 along the left side wall of the base body 21, a right insert arm 223 extending forward from the right end of the rear insert arm 221 along the right side wall of the base body 21, and a pair of support arms 224 extending inward from the front and rear ends of the right insert arm 223 to embed into the third protrusion 23; the buffer member 25 is fixedly connected to the support arm 224 to better support the buffer member 25 and ensure that the buffer member 25 can have a better buffering effect.

In addition, as shown in FIG. 8, a pair of support arms 224 arranged at intervals may also be protruded from an inner side of the left insert arm 222, and the buffer member 25 may be fixedly installed on each support arm 224, so that the multiple buffer member 25 can be distributed as evenly as possible in the circumferential direction, so that the buffer member 25 can exert a more uniform buffering effect on the movable part of the lens assembly, thereby preventing the movable part of the lens assembly from being skewed under the buffering effect of the buffer member 25.

It is worth mentioning that, since the support arm 224 at the front end of the right insert arm 223 is adjacent to the edge of the insert body 22, the support arm 224 at the front end of the right insert arm 223 is easily deformed during the solidification molding process of the base body 21, thereby affecting the position accuracy of the buffer member 25 at the front end of the right insert arm 223, and it is difficult to ensure that the four buffer members 25 remain flush. In this way, when the focus bracket 45 moves downward along the optical axis to collide with the buffer member 25, the focus bracket 45 is prone to tilt; therefore, as shown in FIG. 8, the insert body 22 may further comprise a partial insert arm 225 extended from the front end of the right insert arm 223 along the front side wall of the base body 21 toward the first protrusion 132, so as to enhance the strength of the insert body 22 adjacent to the front end of the right insert arm 223, reduce the deformation of the support arm 224 located at the front end of the right insert arm 223 in the insert body 22 during the curing process of the base body 21, ensure that the four buffer members 25 remain flush, and prevent the focusing bracket 45 from being skewed due to collision with the buffer member 25.

In addition, as shown in FIG. 7 and FIG. 9, the motor assembly 40 may further comprise a ball bearing 47 rollably disposed between the insert base 20 and the focus bracket 45 to allow the motor assembly 40 to drive the optical lens 30 to move along the optical axis direction.

Optionally, as shown in FIG. 7 and FIG. 9, the front and rear ends of the left side wall of the base body 21 are provided with a first half groove 210 partially matching the ball bearing 47 and recessed outward; the focus bracket 45 is provided with a second half groove 450 corresponding to the first half groove 210 and recessed inward, and the first half groove 210 and the second half groove 450 together form a rolling groove structure for accommodating the ball bearing 47 as another fourth protrusion 61 and another fifth protrusion 62. At the same time, as shown in FIG. 7 and FIG. 8, the left front corner and the left rear corner of the molded base 131 are respectively provided with the first avoidance notch 1301 for avoiding the fourth protrusion 61 and the second avoidance notch 1302 for avoiding the fifth protrusion 62, so as to reduce the circumferential size of the camera module 1.

The technical features of the above embodiments may be combined arbitrarily. To make the description concise, not all possible combinations of the technical features in the above embodiments are described. However, as long as there is no contradiction in the combination of these technical features, they should be considered to be within the scope of this specification.

The above embodiments only express several implementation methods of the present invention, and the descriptions thereof are relatively specific and detailed, but they cannot be understood as limiting the scope of the invention patent. It should be pointed out that, for ordinary technicians in this field, several variations and improvements can be made without departing from the concept of the present invention, and these all belong to the protection scope of the present invention.

What is claimed is:

1. A camera module comprising:
    a photosensitive assembly comprising a support substrate, a photosensitive chip, and a molded part injection-molded on the support substrate; and
    a lens assembly comprising an insert base and an optical lens disposed on the insert base and located in a photosensitive path of the photosensitive chip; the insert base comprises a base body and an insert body embedded in the base body, the base body is fixed to the support substrate and defines a cavity together with the support substrate;
    wherein the molded part comprises a molded base located in the cavity on an inner side of a peripheral edge of the support substrate, and a first protrusion extended outward from the molded base to outside the cavity, and the insert body and the first protrusion are staggered with each other in a circumferential direction of the base body, so as to allow the insert body and the first protrusion to overlap with each other in a height direction of the camera module.

2. The camera module according to claim 1, wherein the support substrate comprises a photosensitive circuit board electrically connected to the photosensitive chip, the lens assembly further comprises a lens circuit board arranged on a side wall of the base body, wherein the lens circuit board is provided with pins electrically connected to the photosensitive circuit board, and the pins and the first protrusion are located on different sides of the base body.

3. The camera module according to claim 2, wherein the first protrusion and the pins are respectively located at front and rear sides of the base body.

4. The camera module according to claim 2, wherein the lens assembly comprises a magnetic member connected to the optical lens and a coil disposed on the lens circuit board and arranged corresponding to the magnetic member, and the coil is located on a side wall of the base body that is different from the side where the first protrusion is located.

5. The camera module according to claim 4, wherein the lens circuit board is provided with the coils which are respectively provided on left and right side walls of the base body.

6. The camera module according to claim 5, wherein the lens circuit board is located on an inner surface and/or outer surface of the base body, the insert base has an accommodating notch opened on a side wall of the base body for accommodating each corresponding coil, and the insert body is partially embedded in an interior of the base body and is located below the accommodating notch.

7. The camera module according to claim 1, wherein an upper surface of the first protrusion is lower than an upper surface of the molded base.

8. The camera module according to claim 7, wherein a step portion is provided on an outer side wall of the base body, and a step surface of the step portion is higher than the insert body, wherein the lens assembly further comprises a shell covering the base body, and a lower edge of the shell is located above the step surface of the step portion.

9. The camera module according to claim 2, wherein the molded part further comprises a second protrusion extended from the molded base to outside the cavity.

10. The camera module according to claim 9, wherein the first protrusion and the second protrusion are respectively arranged adjacent to diagonals of the insert base.

11. The camera module according to claim 10, wherein the second protrusion and the pins are staggered with each other in the circumferential direction of the base body.

12. The camera module according to claim 1, wherein the molded part further comprises a second protrusion extended from the molded base to outside the cavity.

13. The camera module according to claim 12, wherein the support substrate is provided with a groove matching the second protrusion, and the second protrusion is filled in the groove.

14. The camera module according to claim 12, wherein a cross-sectional area of the first protrusion is greater than a cross-sectional area of the second protrusion.

15. The camera module according to claim 1, wherein the insert base further comprises a third protrusion protruded inward from an inner surface of a rear side wall of the base body.

16. The camera module according to claim 15, wherein an inner side wall of the lens assembly is provided with an inwardly protruding protrusion assembly at at least one corner, and the molded part is provided with an avoidance notch group at at least one corner corresponding to the protrusion assembly on the molded base.

17. The camera module according to claim 16, wherein the protrusion assembly comprises a fourth protrusion protruded inward from a front corner of the lens assembly and a fifth protrusion protruded inward from a rear corner of the lens assembly, the avoidance notch group comprises a first avoidance notch located at a front corner of the molded base avoiding the fourth protrusion and a second avoidance notch located at a rear corner of the molded base avoiding the fifth protrusion, wherein the second avoidance notch is larger than the first avoidance notch.

18. The camera module according to claim 15, wherein the insert base has an accommodating area recessed inward from an outer surface of a rear side wall of the base body, wherein the lens assembly further comprises a lens circuit board arranged on a side wall of the base body and provided with pins, and the pins on the lens circuit board are located within the accommodating area.

* * * * *